Nov. 11, 1969   CARL-GUSTAF HÅRD AF SEGERSTAD   3,477,300
VARIABLE SPEED TRANSMISSION

Filed Nov. 28, 1967   4 Sheets-Sheet 1

INVENTOR
CARL-GUSTAF HÅRD AF SEGERSTAD
BY
ATTORNEYS

Nov. 11, 1969   CARL-GUSTAF HÅRD AF SEGERSTAD   3,477,300
VARIABLE SPEED TRANSMISSION

Filed Nov. 28, 1967                              4 Sheets-Sheet 3

INVENTOR
CARL-GUSTAF HARD AF SEGERSTAD

United States Patent Office 3,477,300
Patented Nov. 11, 1969

3,477,300
VARIABLE SPEED TRANSMISSION
Carl-Gustaf Hård af Sederstad, Strandvagen 22,
Sandviken, Sweden
Filed Nov. 28, 1967, Ser. No. 686,168
Claims priority, application Sweden, Nov. 30, 1966,
16,348/66
Int. Cl. F16h *37/06, 27/00, 29/00*
U.S. Cl. 74—112                                    8 Claims

ABSTRACT OF THE DISCLOSURE

This disclosure relates to a device for the continuous variation of a gear transmission including a housing, a driving gear and a driven gear in coaxial relationship carried by the shaft, an intermediate transmission gear coaxially carried by the shaft and coupled between the driven and driving gears, a reversing gear adjacent the driven gear, a planetary gear adjacent the driving gear, the reversing gear including a toothed wheel coupling the driven gear to the intermediate transmission gear wherein the toothed wheel of said planetary gear includes a rod projecting outwardly of said housing whereby said last-mentioned toothed wheel can be manually arcuately adjusted to vary the relative displacement of said driving and driven gears.

---

The present invention relates to a device for continuous variation of a gear transmission, in which planetary and reversing gearings are coupled between a driving gear and a driven gear co-axially adapted thereto, the driven gear being shaped as or operatively connected to an adjusting means effecting the continuous variation, the planetary gearing being in engagement with the driving gear and the reversing gear with the driven gear, the wheels of said planetary and reversing gearings being interconnected by an intermediate transmission gear co-axial to the driving gear and the driven gear, and the planetary gearing being rotatable in both directions of rotation for the purpose of adjusting the drivable gear and the adjusting means connected thereto, whereas the other reversing gearing is fixed or fixable or perhaps brakeable against rotation.

An object of the invention is to provide a device of the kind stated in which stepless speed and torque variation may be effected during operation, i.e. without any interruption and without the necessity to unload, even momentarily, any driving torque.

Said object of the invention is obtained in that the rotatable planetary gearing is disposed in a manner to influence, upon the action of varying output load on the driven gear, an elastically yielding device, e.g. a spring, disposed so as to increase, relatively, the output driving torque of the driven gear at increasing load and to decrease the said torque at decreasing load and thus to effect an automatic torque conversion through feed back action.

According to the invention the said device or spring is extending around the rotatable planetary gearing and is attached on one hand to the shaft of the planet wheel of said planetary gearing, on the other to a house or something similar surrounding the planetary gearing.

The planet gear shaft also acts as an operating or adjusting rod.

In a suitable embodiment according to the invention the adjusting member is a ring or disc with a hole eccentrically located, into which a gear fixed on the common shaft and eccentric to a corresponding degree and dimensioned accordingly is received, whereby an adjustment is possible continuously from a small transmission ratio to an infinite ratio and vice versa.

To the ring mentioned any operating means may be connected, e.g. connecting rods for driving any pistons, e.g. pump pistons.

The invention will be more fully explained below with reference to the drawings enclosed, in which preferred embodiments are presented as examples of the idea of the invention.

Figure 1:
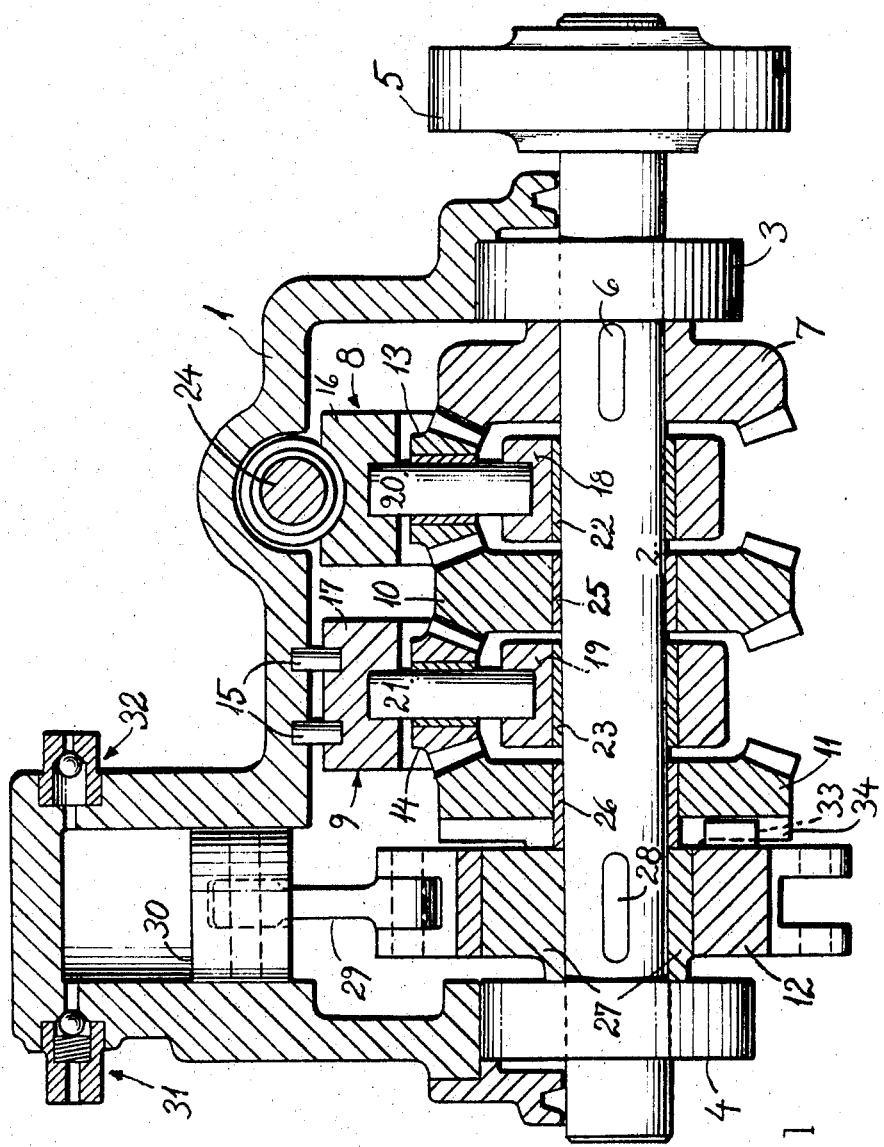

FIG. 1 shows mainly in section a first embodiment, in which a driven gear is adapted to adjust an eccentric ring itself varying the stroke of one or several connecting rods.

Figure 2:
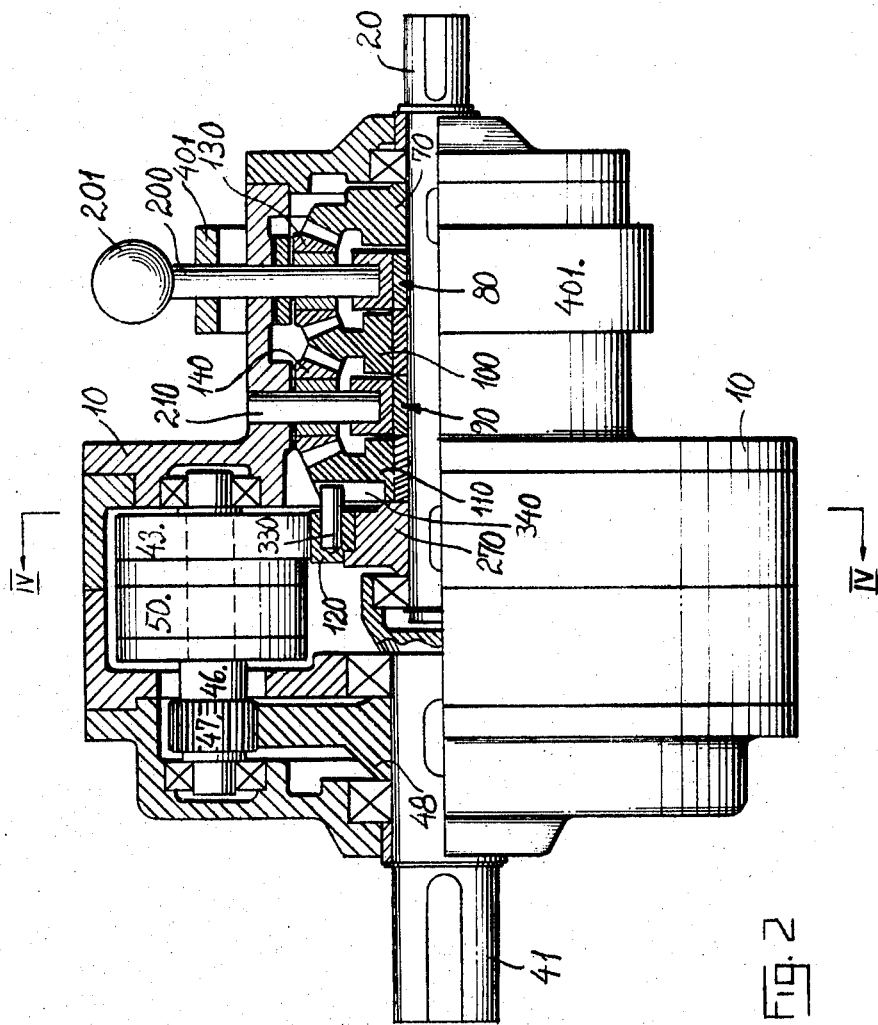
Figure 3:
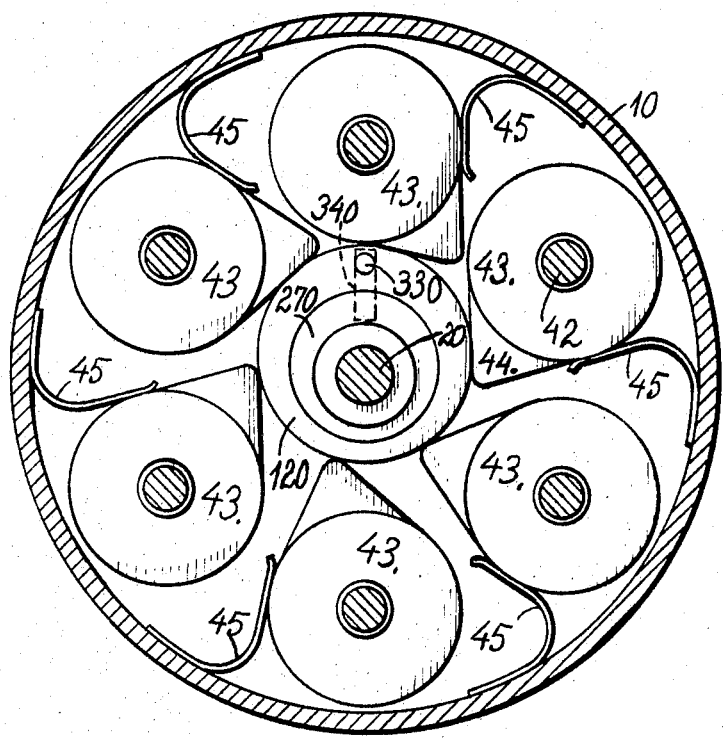
Figure 4:
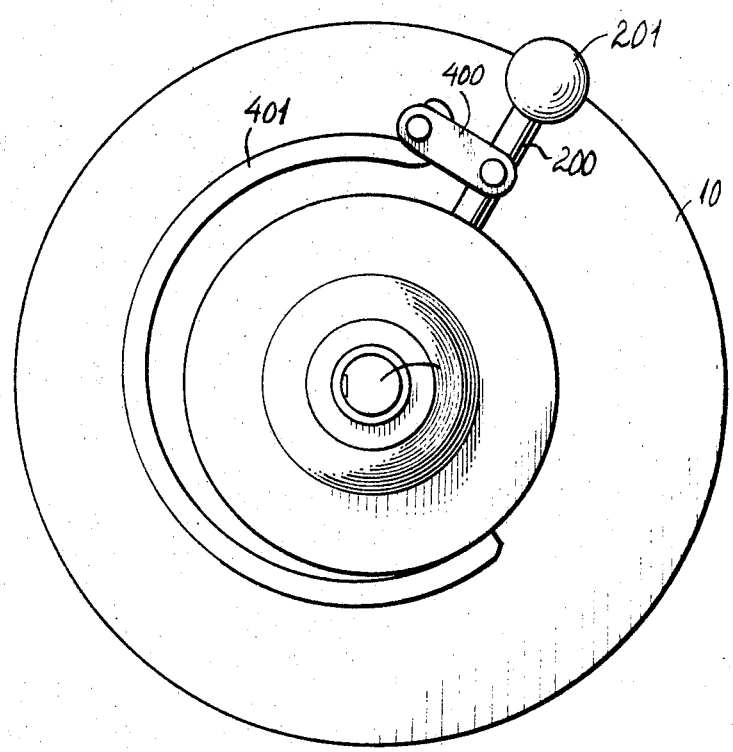

FIGS. 2–4 present an embodiment similar to FIG. 1, where the eccentric ring is adapted to operate pivotable cams.

Reference is first made to the embodiment shown in FIG. 1. The numeral 1 designates a gear housing, in which a shaft 2 is rotatably journalled by means of bearings 3 and 4 of any suitable type.

In accordance with the main feature of the present invention planetary and reversing gearings, generally designated 8 and 9 respectively, are coupled between a driving gear 7, being fixed to the shaft 2 by means of a key 6, and a driven gear 11 co-axially adapted to the gear 7, the gear 11 being operatively connected to a member 12 effecting the continuous variation. Said one gearing 8 is in engagement with the driving gear 7 and the other 9 with the driven gear 11, and the wheels 13 resp. 14 of which gearings are interconnected by an intermediate transmission gear 10 co-axial to the driving gear 7 and the driven gear 11 the planetary gearing 8 being rotatable in both directions of rotation in order to adjust the drivable gear 11 and the member 12 connected thereto, whereas the other gearing 9 is fixed or fixable or at times capable of being braked against rotation through fixing pins 15.

The driving gear 7, the driven gear 11, the gearings 8 and 9 and the transmission gear 10 are all journalled on the shaft 2 and accordingly co-axial to each other. Each of the two gearings 8 and 9 consists of an outer ring 16 resp. 17, and an inner ring 18 resp. 19, the outer and the inner ring being interconnected by pins 20 resp. 21 at the same time acting as journals for the wheels 13 and 14. The inner rings 18 and 19 are journalled on the shaft 2 by means of bearings 22 resp. 23.

While, as mentioned above, the ring 17 is fixed to the housing 1, the ring 16 of the planetary gearing 8 is rotatable to and fro and thus adjustable in suitable positions by means of a threaded screw 24, which is rotatably journalled in the housing 1 and threadedly engaged with the ring 16, which is provided with a mating peripherical threading to that end.

25 and 26 designate bearings, by means of which the transmission gear 10 and the driven gear 11 are rotatably journalled on the shaft 2.

The eccentric ring 12 is rotatably mounted to a wheel 27 eccentric to a corresponding degree and fixed to the shaft 2 e.g. by means of a key 28. In the present case the ring 12 is adapted to operate connecting rods or the like 29, connected to pistons 30, which in co-operation with valve devices 31 and 32 accomplish pumping work.

It is evident that the construction presented may include one or several such pumping devices.

In the relative position between the components 12 and 27 the pumping efficiency is approximately zero, i.e. the adjustment of the ring 12 in relation to the wheel 27 means no stroke of the piston 30 when rotating the shaft 2 and the gear 11. However, by rotating the screw 24 it is possible to provide a varied relative position between the gears 7 and 11 and thus also between the ring 12 and the wheel 27 and thereby provide an increase of the stroke of the piston 30. This increase may be chosen optionally and at a variable speed from 0 to maximum; the max. stroke corresponds to a position, where the ring 12 is adjusted by 180° in relation to the position relative to the wheel 27 indicated in FIG. 1. By rotating the screw 24 around into one or the other direction a corresponding rotation of the planetary gearing 8 in relation to the driving gear 7 will be obtained, as will be easily seen. The transmission gear 10 will thereby get double the extent of adjustment in relation to the gear 7, and through the gearing 9, which is fixed to the housing 1, an equal rotating adjustment of the driven gear 11 but in the opposite direction is obtained and thereby also of the ring 12 connected to the gear 11.

By manipulating the screw 24 it is thus possible to adjust the ring 12 in relation to the wheel 27 quite continuously or steplessly and with great accuracy and thereby vary the stroke of the connecting rod 29 and the piston 30 connected thereto, and this adjustment is equally possible to effect for a stationary shaft 2 as well as when it is rotating at any optional rotative speed.

The gear 11 and the ring 12 may be opeartively connected to each other in any suitable way. In the embodiment shown in FIG. 1 the ring 12 is provided with a projection 33 engaging a radial slot or an aperture 34 of the gear 11. The projection 33 is thus free to move in radial direction in relation to the gear 11 in the course of adjustment movement.

The embodiment shown in FIGS. 2–4 also presents a driving shaft 20, to which a bevel gear 70 is rigidly secured and engaging one or several bevel gears 130 of a planetary gearing generally designated by 80, which in turn operatively engages an intermediate transmission gear 100, in turn engaging a bevel gear 140 of a reversing gearing generally designated by 90 and engaging a driven gear 110 for adjustment according to the idea of the invention by a ring 120 being eccentrically shaped and mounted to a wheel 270 tapered in a corresponding way, which in the same way as the wheel 27 shown in FIG. 1 is rigidly secured to the shaft 20. A pin 330 engages a radial slot 340 of the gear 110 in the same way as the pin 33 in FIG. 1.

As distinguished from the embodiment shown in FIG. 1 the gearings 80 and 90 in FIG. 2 have no counterparts to the outer rings 16 and 17 in FIG. 1. Instead the pin 20 in FIG. 1 is replaced by an extended pin 200, which is provided with a handle knob 201 and acts as a control lever to operate the desired continuous variation of the gear ratio of the device. In a corresponding way the journal 21 of the reversing gearing shown in FIG. 1 is replaced by a journal 210, which is equally extended and itself acting as a substitute for the fixing pins 15 shown in FIG. 1, the journal 210 engaging directly the housing 10 shown in FIG. 2.

As will be seen from FIG. 4, the pin or the lever 200 is connected by a link 400 to a spring 401, which is secured to the housing 10 and acts as an automatic control to the complete device, the spring 401 yielding to increasing torque on the gearing 80, thereby causing an adjustment of the ring 120 in such a direction in relation to the wheel 270 that the transmisison ratio will be reduced and thereby also the stress on the planetary gearing 80 and the lever 200. Independently of the automatic control it is of course possible to easily adapt or provide any desired gear ratio at any time by manipulating the lever 200.

The shaft 20 is an input shaft, whereas an output shaft is designated by 41. For transmitting the driving from the shaft 20 to the shaft 41 the ring 120 is provided to operate one or several cam members 43 rotatable around shafts 42, the cams 44 of which are urged towards the ring 120 by springs 45. The rotating movements imparted to the cam member 43 when rotating the ring 120 are transmitted in a way known per se to a shaft 46 with a gear 47 engaging a gear 48 fixed to the shaft 41.

As will be particularly apparent from FIG. 2 the gear housing 10 may in a suitable skilled way be composed or constructed of several different parts, the arrangement of which per se is no feature in the present invention.

The gears 7, 13, 10, 14 and 11 existing in the embodiment according to FIG. 1 and the corresponding gears of the other embodiments may preferably be bevel gears, although wheel modifications equivalent to such gears may possibly be used.

Finally it may generally be pointed out that the invention is not to be regarded as limited to the embodiments presented, as the invention may be modified within a wide range. Thus the gears 11, 110 and 11′ adjustable and controllable according to the idea of the invention may be used for controlling completely optional parts or objects associated with them without any limit.

Gearings 9 or 20 may be operable by any suitable brake means instead of being entirely fixed to the gear housing.

The planetary gearings 8 or 80 here presented can be controllable by means of any other devices than the devices 24 and 200 shown here.

In the embodiment shown in FIGS. 2 and 3 a transmission device generally designated by 50 for transmitting the drive from the members 43 to the shaft 46 may consist of a free wheel device of any suitable kind e.g. comprising inclined planes and balls or rollers co-operating with them, catch members, etc.

The driven gears 11 and 110 have here been shown as adapted to operate control members 12, 120 and 50, 51. It is evident that the gears just mentioned may be designed or provided to function themselves more or less directly as control members.

Also in other respects the present invention is variable within the scope of the appended claims.

The embodiment of the invention in which an exclusive property or privilege is claimed are defined in the following claims:

1. A device for the continuous variation of a gear transmission comprising a housing, means journalling a shaft for rotation in said housing, a driving gear and a driven gear in coaxial relationship carried by said shaft, an intermediate transmission gear coaxially carried by said shaft and coupled between said driven and driving gears, a reversing gear adjacent said driven gear, a planetary gear adjacent said driving gear, said reversing gear including a toothed wheel coupling said driven gear to said intermediate transmission gear, said planetary gear including a toothed wheel coupling said driving gear to said intermediate transmission, means mounting the toothed wheel of the planetary gear for movement about an arc generally concentric to the axis of said shaft, means for preventing movement of the toothed wheel of the reversing gear except for rotation about its own axis, and means for effecting yielding movement of the toothed wheel of the planetary gear along said arc to relatively angularly displace the driven and driving gears with respect to each other through said toothed wheels and said intermediate transmission gears in response to output load.

2. The device according to claim 1 wherein said means for effecting yielding movement is a spring, and means coupling said spring between said housing and toothed wheel of said planetary gear.

3. The device according to claim 1 wherein said means for effecting yielding movement is a screw, means for journalling said screw for rotation in said housing, and means connecting said screw to the toothed wheel of said planetary gear.

4. The device according to claim 2 wherein the toothed wheel of said planetary gear includes a rod projecting outwardly of said housing whereby said last-mentioned toothed wheel can be manually arcuately adjusted to vary the relatively displacement of said driving and driven gears.

5. The device according to claim 2 including means coupled to and driven by said driven gear, and said driven coupling means and driven gear being coupled to each other by interconnected projection and slot means.

6. The device according to claim 5 wherein said coupling means is a ring, and said ring is eccentrically mounted upon said shaft.

7. The device according to claim 6 including a plurality of cam members mounted in said housing and said cam members having surfaces disposed in contacting relationship with an exterior surface of said ring during the rotation thereof.

8. The device according to claim 6 including a plurality of pistons within said housing, and means connecting each of said pistons to said ring.

References Cited

UNITED STATES PATENTS

| | | | |
|---|---|---|---|
| 2,730,345 | 1/1956 | Sloane | 74—675 |
| 2,940,337 | 6/1960 | Kalb | 74—675 |
| 3,082,646 | 3/1963 | Friedmann et al. | 74—112 |
| 3,359,813 | 12/1967 | Ikano | 74—117 |

FRED C. MATTERN, Jr., Primary Examiner

W. S. RATLIFF, Jr., Assistant Examiner

U.S. Cl. X.R.

74—675